(12) United States Patent
Wachi

(10) Patent No.: US 7,698,605 B2
(45) Date of Patent: Apr. 13, 2010

(54) DEVICE AND METHOD FOR DEVICE USING ELECTRONIC MAIL

(75) Inventor: Yoshio Wachi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 701 days.

(21) Appl. No.: 11/126,254

(22) Filed: May 11, 2005

(65) Prior Publication Data

US 2005/0273658 A1 Dec. 8, 2005

(30) Foreign Application Priority Data

May 18, 2004 (KR) ............... 10-2004-0035318

(51) Int. Cl.
*G06F 11/00* (2006.01)
(52) U.S. Cl. .................. 714/48; 709/224
(58) Field of Classification Search ........... 714/48, 714/709, 224; 709/224
See application file for complete search history.

(56) References Cited

U.S. PATENT DOCUMENTS

| 6,085,244 | A * | 7/2000 | Wookey .............. 709/224 |
| 6,917,981 | B1 * | 7/2005 | Buck et al. .......... 709/230 |
| 2003/0195982 | A1 | 10/2003 | Motoyama et al. .... 709/238 |
| 2005/0033834 | A1 * | 2/2005 | Nutt .................. 709/223 |
| 2005/0081121 | A1 * | 4/2005 | Wedel et al. ......... 714/48 |
| 2005/0084092 | A1 * | 4/2005 | Rice ................... 379/229 |
| 2005/0138473 | A1 * | 6/2005 | Mathew et al. ....... 714/27 |
| 2005/0182834 | A1 * | 8/2005 | Black ................. 709/224 |
| 2005/0236473 | A1 * | 10/2005 | Lenz et al. ........... 235/380 |
| 2006/0198319 | A1 * | 9/2006 | Schondelmayer et al. ... 370/252 |

FOREIGN PATENT DOCUMENTS

| CN | 1371062 A | 9/2002 |
| JP | 08-286990 | 11/1996 |
| JP | 11-102303 | 4/1999 |
| JP | 14-228553 | 8/2002 |
| KR | 1998-0013127 | 4/1998 |
| WO | WO 03/090410 | 10/2003 |

* cited by examiner

*Primary Examiner*—Scott T Baderman
*Assistant Examiner*—Kamini Patel
(74) *Attorney, Agent, or Firm*—Roylance, Abrams, Berdo & Goodman, L.L.P.

(57) ABSTRACT

An apparatus and method for enabling a device to notify a main server of a diagnosis result in a network system having a main server and the device connected to the main server is provided. The device stores diagnosis items and diagnosis execution information to diagnose with respect to the diagnosis items at an initial network configuration phase. Upon receiving a diagnosis execution item to be substantially diagnosed among the diagnosis items, the device delivers a diagnosis result of the diagnosis execution item to the main server using the diagnosis execution information. As the main server has only to send the diagnosis execution information to the device only once, so the load on the main server can be reduced.

21 Claims, 7 Drawing Sheets

DEVICE AND METHOD FOR DEVICE USING ELECTRONIC MAIL

CROSS-REFERENCE TO RELATED APPLICATIONS

This application claims the benefit under 35 U.S.C. § 119(a) of a Korean Patent Application No. 2004-35318 filed on May 18, 2004 in the Korean Intellectual Property Office, the entire disclosure of which is incorporated herein by reference.

BACKGROUND OF THE INVENTION

1. Field of the Invention The present invention generally relates to a diagnosis method for a device connected to a main server. More particularly, the present invention relates to a diagnosis method for a device by use of an electronic mail message.

2. Description of the Related Art

A network system consists of a main server and a plurality of devices. The main server controls and manages the plurality of the devices, as shown in FIG. 1.

Referring to FIG. 1, a network system includes a plurality of devices 102 through 106. The devices may be a printer, a scanner, a facsimile machine and the like. The following describes a method by which a main server 100 diagnoses the devices 102 through 106 in the network system, especially when a first device 102 operates abnormally.

The first device 102 having an abnormal operation notifies the main server 100 of the abnormality. The main server 100 selects one of diagnosis programs stored therein. The main server 100 selects a diagnosis program relating to the notified information among the diagnosis programs.

The main server 100 sends the selected diagnosis program to the first device 102 notifying the abnormal operation. The first device 102 diagnoses the abnormal operation by use of the received diagnosis program and acquires a diagnosis result. The first device 102 sends the diagnosis result to the main server 100.

As explained above, the main server 100 transfers a diagnosis program capable of removing the abnormal operation. The greater the number of devices in the network, the greater the number of messages delivered to the main server 100. In this situation, the main server 100 has to transfer diagnosis programs to all of the devices indicating the abnormal operation. Furthermore, the main server needs to select and transfer a suitable diagnosis program relating to the indicated abnormal operation.

Accordingly, as the number of the devices in the network increases, the load on the main server 100 also increases, which requires a solution to reduce the load on the main server 100.

SUMMARY OF THE INVENTION

The present invention has been developed in order to solve the problems discussed above and others associated with the conventional arrangement. An aspect of the present invention provides a device and method for reducing the load on a main server which manages the devices.

Another aspect of the present invention provides a device and method capable of changing a diagnosis period of a device under the control of a main server.

A further aspect of the present invention provides a device and method for changing a diagnosis execution item according to a status of a device in network.

To achieve the above aspects of the present invention, a diagnosis method of a device in a network system comprising a main server and at least one device, which notifies the main server of a diagnosis result, comprises the steps of storing one or more diagnosis items and diagnosis execution information to diagnose with respect to the diagnosis items, receiving a diagnosis execution item to be substantially diagnosed from among the diagnosis execution items, and acquiring a diagnosis result with respect to the received diagnosis execution item by use of the diagnosis execution information.

Consistent with the above aspects of the present invention, a method to notify a main server of a diagnosis result in a network system comprising the main server and at least one device which notifies the main server of the diagnosis result, comprises the steps of sending a diagnosis execution item to be substantially diagnosed among one or more diagnosis items, and notifying or indicating a diagnosis result with respect to the diagnosis execution item by use of diagnosis execution information to diagnose for diagnosis items.

Consistent with the above aspects of the present invention, a device to diagnose errors in a network system comprising a main server and at least one device which notifies or indicates to the main server a diagnosis result further comprises a storage for storing one or more diagnosis items and diagnosis execution information to diagnose with respect to the diagnosis items, an electronic mail (e-mail) receiver for receiving a diagnosis execution item to be substantially diagnosed from among the diagnosis items, and a diagnosis part for acquiring a diagnosis result with respect to the received diagnosis execution item by use of the diagnosis execution information.

A main server, which receives an indication of a diagnosis result in a network system comprising the main server and at least one device which indicates to the main server the diagnosis result, comprises an electronic mail (e-mail) sender for sending a diagnosis execution item to be substantially diagnosed from among one or more diagnosis items, and an e-mail receiver for receiving a diagnosis result with respect to the diagnosis execution item by use of a diagnosis execution information to diagnose with respect to the diagnosis item.

BRIEF DESCRIPTION OF THE DRAWINGS

These and other aspects and advantages of the invention will become apparent and more readily appreciated from the following description of exemplary embodiments, taken in conjunction with the accompanying drawing figures of which.

DETAILED DESCRIPTION OF EXEMPLARY EMBODIMENTS

Figure 1:
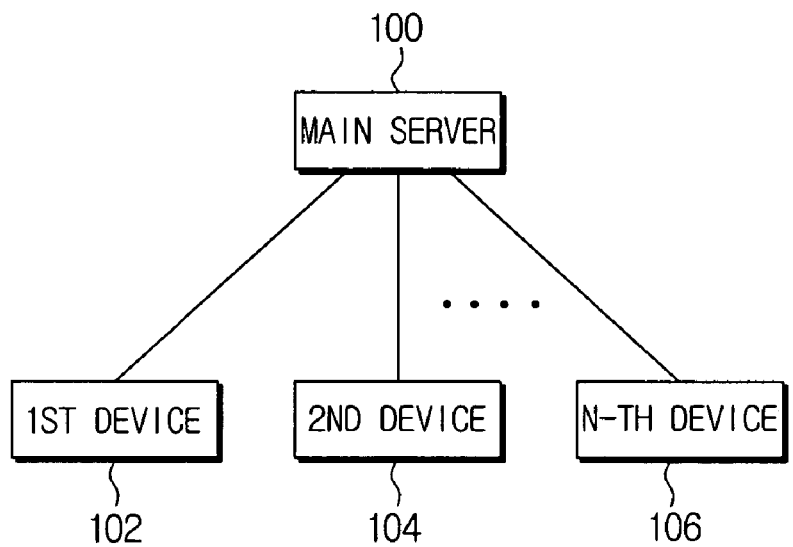
FIG. 1 illustrates a conventional main server connected with a plurality of devices.

Reference will now be made in detail to the embodiments of the present invention, examples of which are illustrated in the accompanying drawings, wherein like reference numerals refer to the like elements throughout. The exemplary embodiments are described below in order to explain the present invention by referring to the drawings.

Figure 2:
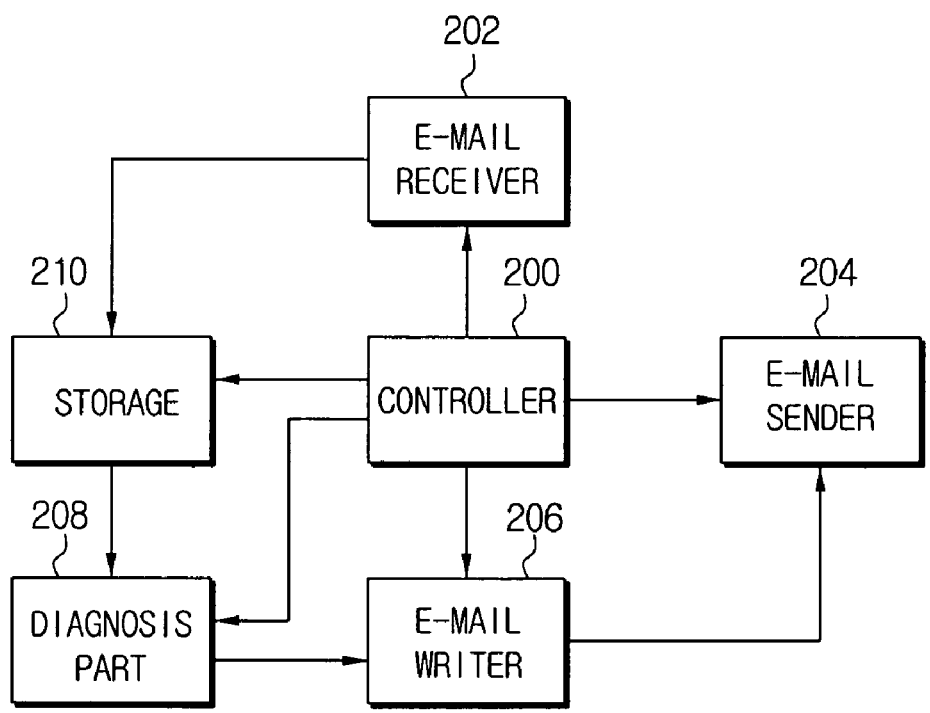
FIG. 2 is a block diagram of a device constructed according to an embodiment of the present invention.

FIG. 2 is a block diagram of a device according to an embodiment of the present invention. The device comprises a controller 200, an e-mail receiver 202, an e-mail sender 204, an e-mail writer 206, a diagnosis part 208, and a storage 210. The construction of the device is explained with reference to FIG. 2. Although FIG. 2 illustrates that the device comprises the controller 200, the e-mail receiver 202, the e-mail sender 204, the e-mail writer 206, the diagnosis part 208 and the storage 210, the device is not limited to this construction.

The e-mail receiver 202 receives an e-mail from a main server. The e-mail receiver 202 extracts a diagnosis menu, a diagnosis program, and diagnosis execution information corresponding to the diagnosis menu and the diagnosis program, which are preferably included in the e-mail delivered from the main server. The diagnosis menu and the diagnosis program are referred to as a diagnosis item. The diagnosis execution information diagnoses with respect to a related diagnosis item. The main server stores the extracted diagnosis item and diagnosis execution information in the storage 210 under the control of the controller 200. The e-mail receiver 202 determines whether information contained in the e-mail received from the main server is a diagnosis request message. If so, the e-mail receiver 202 sends information regarding the diagnosis request message to the controller 200. The electronic mail (e-mail) receiver 202 determines whether the information contained in the e-mail received from the main server is update information for the diagnosis item. If so, the e-mail receiver 202 sends the update information to the storage 210 under the control of the controller 200. According to an embodiment of the present invention, the e-mail receiver 202 receives three sets of information from the main server. Specifically, the e-mail receiver 202 receives the diagnosis item and the diagnosis execution information at an initial configuration phase, and receives the diagnosis request message and the update information received after the initial configuration phase.

The e-mail sender 204 sends an e-mail to the main server under the control of the controller 200. The e-mail writer 206 sends to the e-mail sender 204 an e-mail prepared under the control of the controller 200. The e-mail writer 206 writes an e-mail comprising a diagnosis result provided from the diagnosis part 208 under the control of the controller 200.

The diagnosis part 208 diagnoses a related device by use of the diagnosis execution information under the control of the controller 200. Generally, the device comprises a plurality of components. For example, if the device is a printer, the printer may comprise a toner, a paper tray, and a cartridge. The diagnosis part 208 diagnoses the status of the components under the control of the controller 200, and provides the diagnosis result to the e-mail writer 206.

The storage 210 stores the diagnosis item and the diagnosis execution information received from the e-mail receiver 202. The storage 210 updates the stored diagnosis information using the update information received from the e-mail receiver 202, which will be explained in further detail below.

It has been described that the storage 210 receives the diagnosis item from the main server at the initial configuration phase, for the sake of clarity and conciseness. A user can configure the device to store the diagnosis item directly in the storage 210 at the initial configuration phase without receiving the diagnosis item from the main server.

The controller 200 controls the e-mail receiver 202, the e-mail sender 204, the e-mail writer 206, the diagnosis part 208, and the storage 210 of the device.

Figure 3:
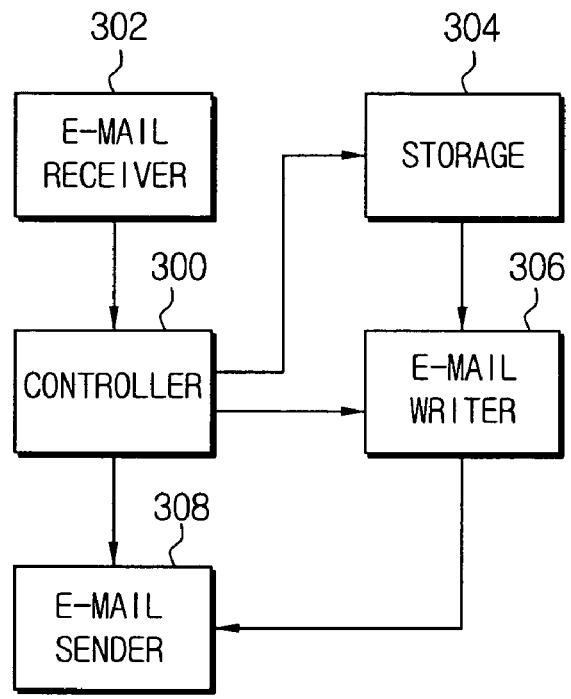
FIG. 3 is a block diagram of a main server constructed according to an embodiment of the present invention.

FIG. 3 is a block diagram of the main server according to an embodiment of the present invention. The main server comprises a controller 300, an e-mail receiver 302, a storage 304, an e-mail writer 306, and an e-mail sender 308, which will be described later in more detail. Although FIG. 3 illustrates that the main server comprises the controller 300, the e-mail receiver 302, the storage 304, the e-mail writer 306, and the e-mail sender 308, the main server is not limited to this construction.

The e-mail receiver 302 receives an e-mail from the device. The e-mail receiver 302 provides the received e-mail to the controller 300. The storage 304 stores a diagnosis item and diagnosis execution information to be delivered to the device. The storage 304 stores update information relating to the diagnosis item. To be specific, the storage 304 stores information relating to a diagnosis execution item and a diagnosis period for each device in the network. The diagnosis item and the diagnosis period will be described below in more detail.

The e-mail writer 306 writes an e-mail containing the diagnosis item and the diagnosis execution information stored in the storage 304 under the control of the controller 300. As mentioned above, if a certain device joins the network, the e-mail writer 306 writes an e-mail including a diagnosis item and diagnosis execution information to be delivered to the certain device. When the e-mail writer 306 does not receive a return e-mail in relation to a diagnosis result over a predetermined time, the e-mail writer 306 prepares an e-mail to request the certain device to diagnose itself The e-mail sender 308 receives the e-mail prepared by the e-mail writer 306 under the control of the controller 300 and sends the e-mail to a related device. The controller 300 controls the e-mail receiver 302, the storage 304, the e-mail writer 306, and the e-mail sender 308 of the main server. The controller 300 determines whether a diagnosis result is received from the related device within a stored diagnosis period. If not, the controller 300 controls the e-mail writer 306 to prepare an e-mail requesting the diagnosis.

Figure 4:
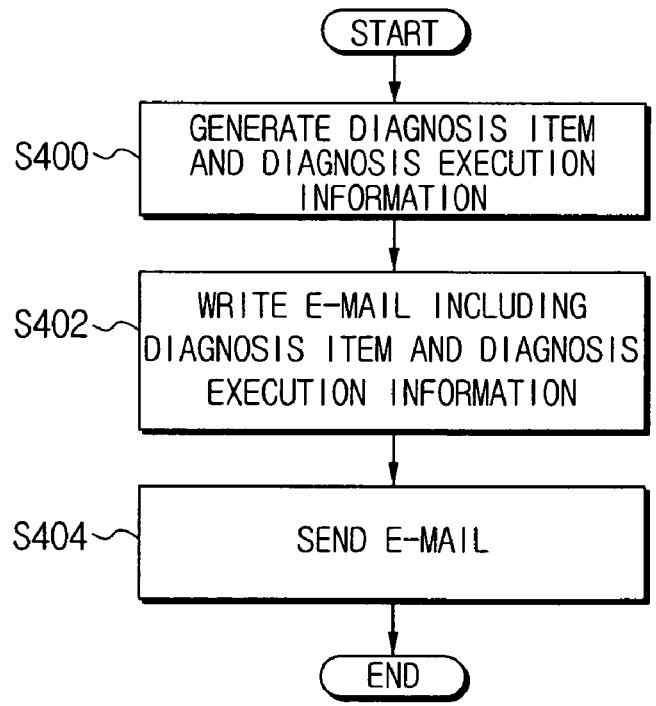
FIG. 4 is a flowchart of an operation of the main server of FIG. 3 according to an embodiment of the present invention.

FIG. 4 illustrates the operation of the main server at an initial configuration phase according to an embodiment of the present invention.

The main server generates a diagnosis item and diagnosis execution information relating to the diagnosis to be used for devices forming the network (S400). Although the main server generates the diagnosis item and the diagnosis information (S400), the diagnosis item and the diagnosis execution information can be provided by a user. Table 1 is a diagnosis menu generated by the main server, and Table 2 is an exemplary diagnosis program generated by the main server. An identifier can be used to distinguish the diagnosis menu of the diagnosis item and the diagnosis program. As described above, the diagnosis program is not the actual information which diagnoses a device.

TABLE 1

| Diagnosis Menu | Identifier |
|---|---|
| toner | A |
| ink | B |
| ... | ... |
| paper tray | C |

TABLE 2

| Diagnosis Program | Identifier |
|---|---|
| program A | E |
| program B | F |
| ... | ... |
| program N | G |

The main server stores the generated Table 1 and Table 2 in the storage 304.

The main server writes an e-mail containing the generated diagnosis item and diagnosis execution information (S402). As explained above, the e-mail writer 306 prepares the e-mail under the control of the controller 300.

The main server sends the e-mail prepared by the e-mail writer 306 to a related device through the e-mail -sender 308 (S404). The main server can send the same diagnosis item and diagnosis information to all devices forming the network, or different diagnosis items and diagnosis execution information depending on a characteristic of the devices in the network. This is because the devices can be a printer, a facsimile machine, a copier and the like.

Figure 5:
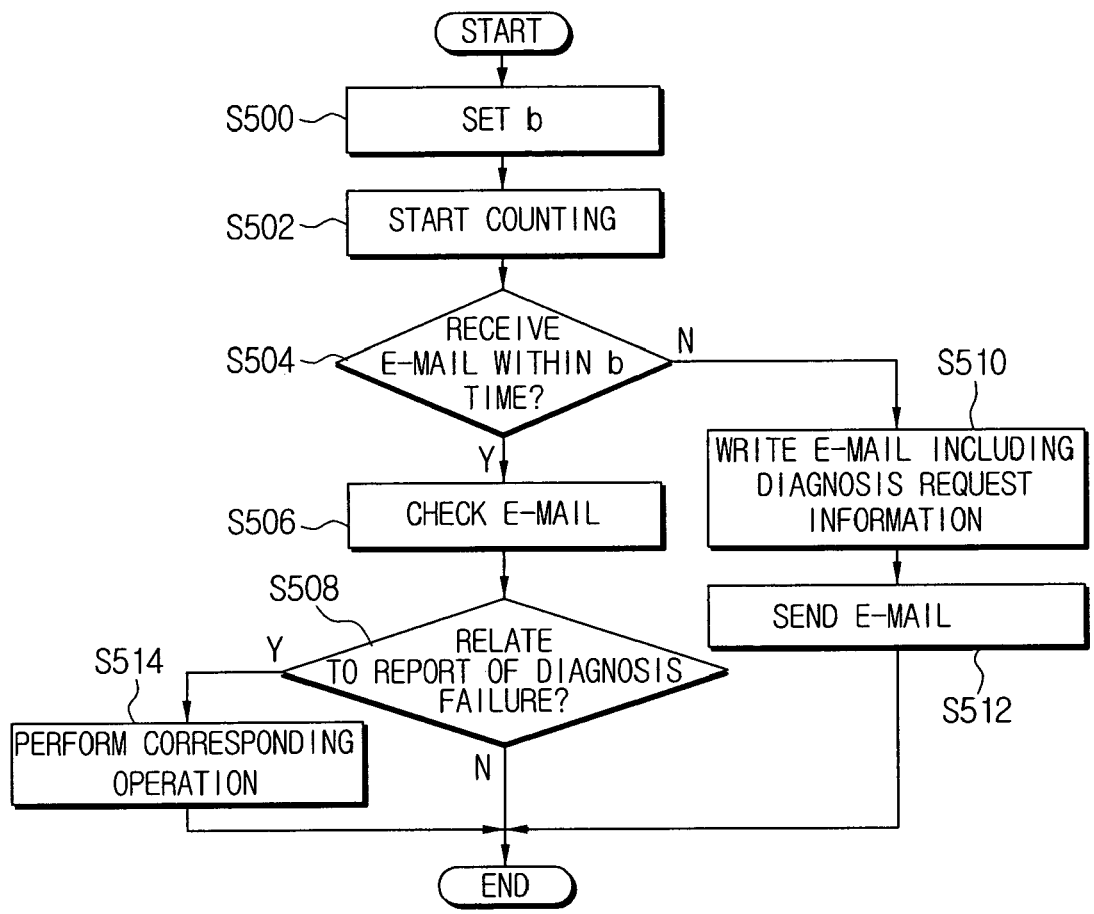
FIG. 5 is a flowchart of an operation of the main server of FIG. 3 according to an embodiment of the present invention.

FIG. 5 is a flowchart of the operation of the main server according to an embodiment of the present invention. While FIG. 4 illustrates the operation at the initial network configuration phase, FIG. 5 illustrates the operation after the initial network configuration phase. The following describes the operation of the main server after the initial network configuration phase with reference to FIG. 5.

The main server sets 'b' (S500). The 'b' is a period in which the diagnosis result of the diagnosis execution item is to be provided from the network device. The diagnosis execution item denotes an item to be substantially diagnosed among the diagnosis items. The main server may be informed of a plurality of diagnosis results with respect to a device. In this situation, the main server sets a plurality of periods for the notification of the diagnosis results. The following explains a case when a diagnosis result is provided with respect to one diagnosis execution item.

The main server starts to count (S502). The main server determines whether an e-mail is received within the 'b' period (S504). If so, the main server proceeds to step S506, or if not, main server proceeds to step S510.

The main server writes an e-mail containing diagnosis request information (S510), and sends the prepared e-mail (S512) to the device.

The main server checks a received e-mail (S506). It is assumed that the e-mail received at step S504 relates to the diagnosis result of the device in this embodiment of the present invention. It is appreciated that the main server can receive an e-mail relating to other information as well as the e-mail relating to the diagnosis result from the device.

The main server determines whether the received e-mail is a report of a diagnosis failure. If so, the main server proceeds to step S514, or if not, the main server terminates the operation. The main server performs a corresponding operation to remove the reported diagnosis failure (S514).

Figure 6:
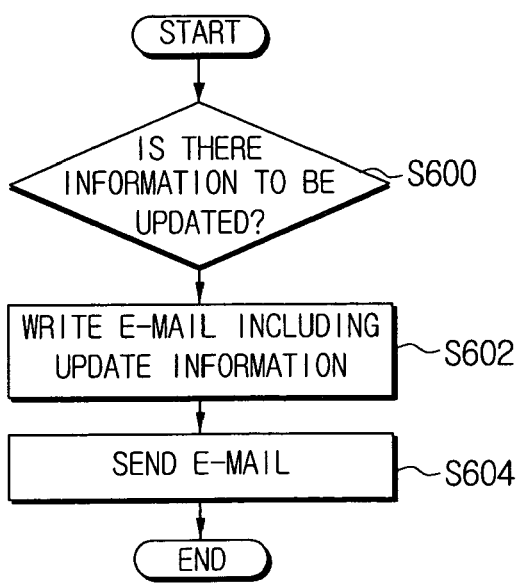
FIG. 6 is a flowchart of an operation of the main server of FIG. 3 according to an embodiment of the present invention.

FIG. 6 illustrates an operation of the main server, in particular, a delivery of the update information from the main server to the device.

The main server determines whether there is information to be updated in relation to the diagnosis item (S600). The information to be updated comprises information relating to the diagnosis execution item and the diagnosis period of the diagnosis execution item. The main server controls the device not to diagnose all of the diagnosis items received at the initial configuration phase but to diagnose some of the diagnosis items. That is, the main server specifies the diagnosis execution item for each device based on the status or conditions of the device. Table 3 and Table 4 show exemplary update information generated by the main server.

TABLE 3

| Diagnosis Menu | Diagnosis | Diagnosis Period (Time) |
|---|---|---|
| toner | O | 2 |
| ink | X | |
| ... | ... | |
| paper tray | O | 3 |

TABLE 4

| Diagnosis Program | Diagnosis | Diagnosis Period (Time) |
|---|---|---|
| program A | O | 2 |
| program B | O | 2 |
| ... | ... | |
| Program N | X | |

The main server writes an e-mail including the update information (S602). The e-mail is prepared by the e-mail writer 306 under the control of the controller 300. The main server sends the prepared e-mail to the device through the e-mail sender 308 (S604).

Figure 7:
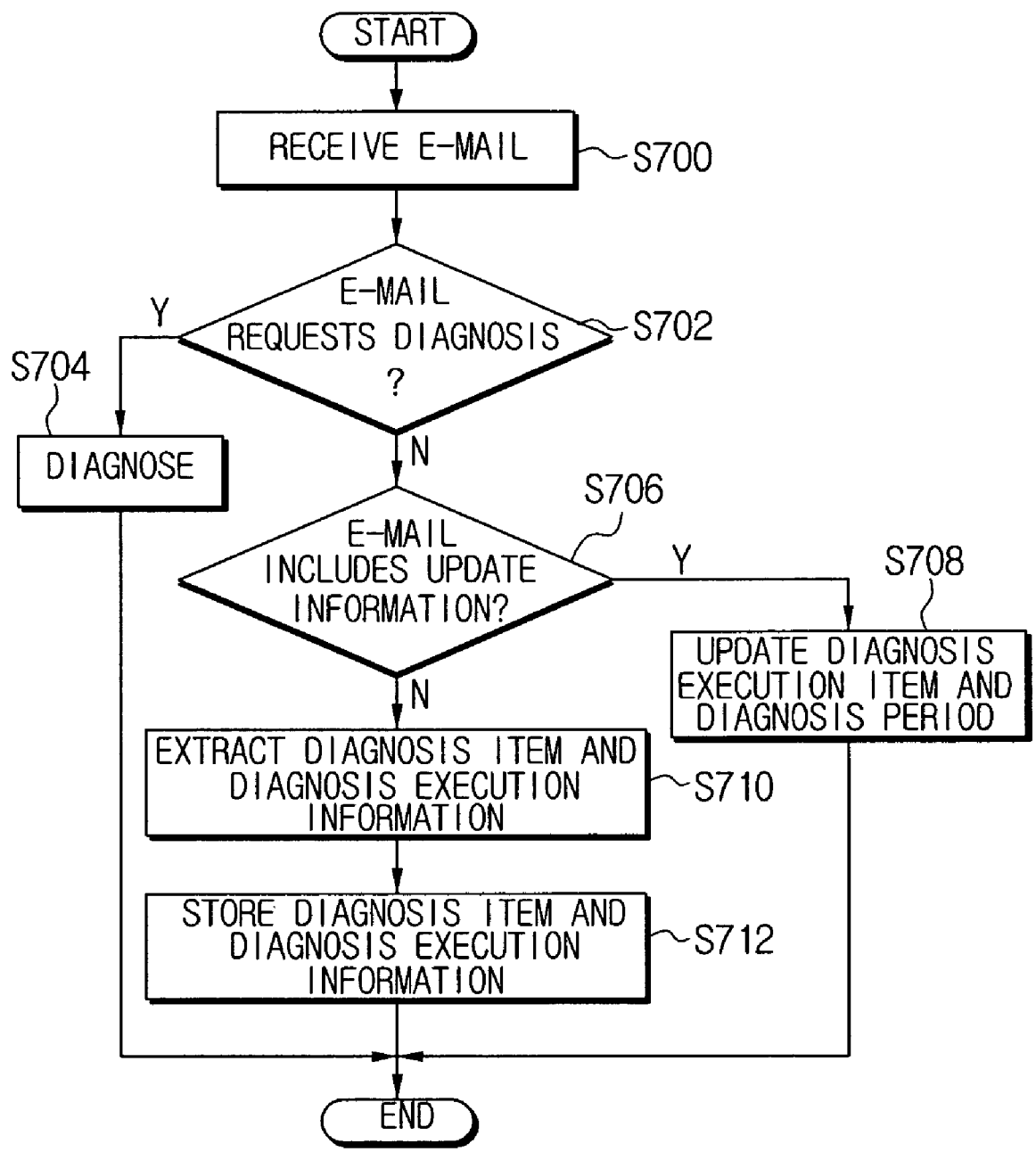
FIG. 7 is a flowchart of an operation of the device of FIG. 2 according to an embodiment of the present invention.

FIG. 7 illustrates an operation of the device according to an embodiment of the present invention when the device receives the e-mail from the main server.

The device receives an e-mail (S700). The device determines whether the received e-mail requests the diagnosis (S702). The main server sends the e-mail requesting the diagnosis to the device when the e-mail comprising the diagnosis result is not received within a predetermined time, as mentioned above. If the received e-mail requests the diagnosis according to the determination that the received e-mail requests a diagnosis, the device proceeds to step S704, otherwise, the device proceeds to step S706.

The device determines whether the received e-mail includes the update information (S706). If so, the device proceeds to step S708. If not, that is, if the received e-mail is the diagnosis item and the diagnosis execution information provided at the initial configuration phase, the device proceeds to step S710.

In step S708, the device extracts the update information from the received e-mail, and updates the stored diagnosis execution item and diagnosis period by use of the extracted update information.

The device extracts the diagnosis execution information relating to the diagnosis item from the received e-mail (S710). The device stores the extracted diagnosis item and diagnosis execution information in the storage 304 (S712). A diagnosis execution item identifies the diagnosis execution information to be used to perform the requested diagnosis of a related diagnosis item. Table 1 and Table 2 show an example of the diagnosis item stored in the storage 304. The device receives the diagnosis item and the diagnosis execution information at the initial network configuration phase, and receives the update information relating to the diagnosis item after the initial network configuration phase.

Figure 8:
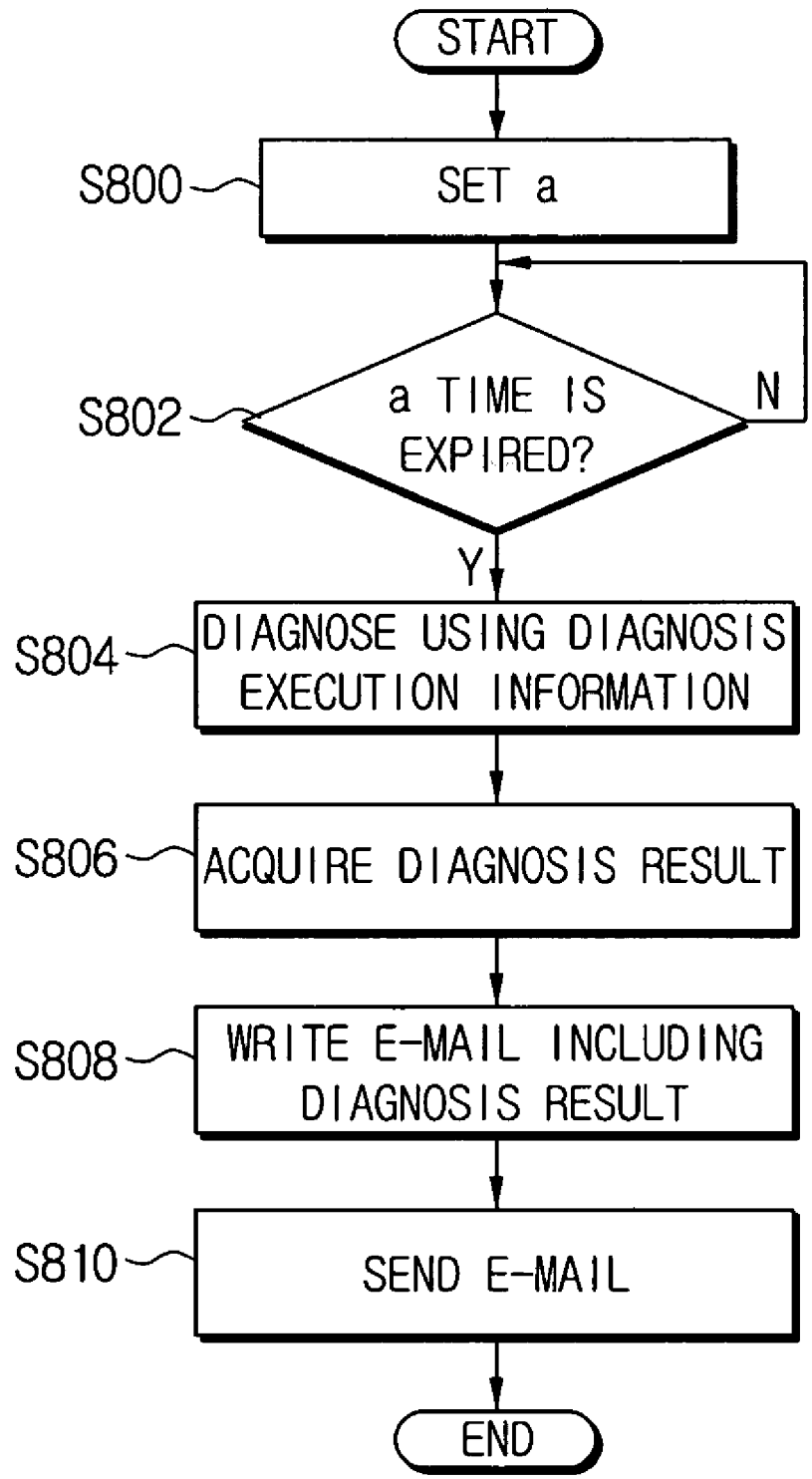
FIG. 8 is a flowchart of an operation of the device of FIG. 2 according to an embodiment of the present invention.

FIG. 8 illustrates the operation when the device prepares an e-mail relating to the diagnosis result.

The device sets 'a' using the information provided from the main server (S800). The 'a' denotes a diagnosis period of the diagnosis execution item. Generally, the 'a' is set smaller than the 'b'. The 'b' is set by adding the 'a' and a delivery time of the e-mail between the device and the main server. The 'a' is set using information included in the update information received from the main server as mentioned above.

The device determines whether the 'a' is expired (S802). If so, the device proceeds to step S804, or if not, the device proceeds to step S802 to inquire whether the "a" time period has expired.

The device diagnoses using the diagnosis execution item and the diagnosis execution information (S804). Although FIG. 8 illustrates the device performing a diagnosis using a single diagnosis execution item, the user can set to diagnose a plurality of diagnosis execution items at one operation. Although Table 4 shows the different diagnosis period of the respective diagnosis execution items, the user can set the same diagnosis period for all of the diagnosis execution items.

The device acquires a diagnosis result (S806). The device prepares an e-mail including information relating to the diagnosis result (S808). If there is no diagnosis result failure, the device may not prepare the e-mail including the information relating to the diagnosis result. In this situation, the main server does not prepare the e-mail requesting the diagnosis even when the predetermined time has expired. The device sends the prepared e-mail to the main server (S810). Upon receiving the e-mail relating to the diagnosis result, the main server performs a required operation depending on the diagnosis result.

In FIG. 8, it is illustrated that the device receives the information relating to both the diagnosis execution item and the diagnosis period from the main server, but the device may receive information relating only to the diagnosis execution item from the main server. In the latter case, the device can pre-set and store information relating to the diagnosis period. The device can diagnose with respect to the diagnosis execution item by use of the diagnosis execution item received from the main server and the stored pre-set diagnosis period.

Figure 9:
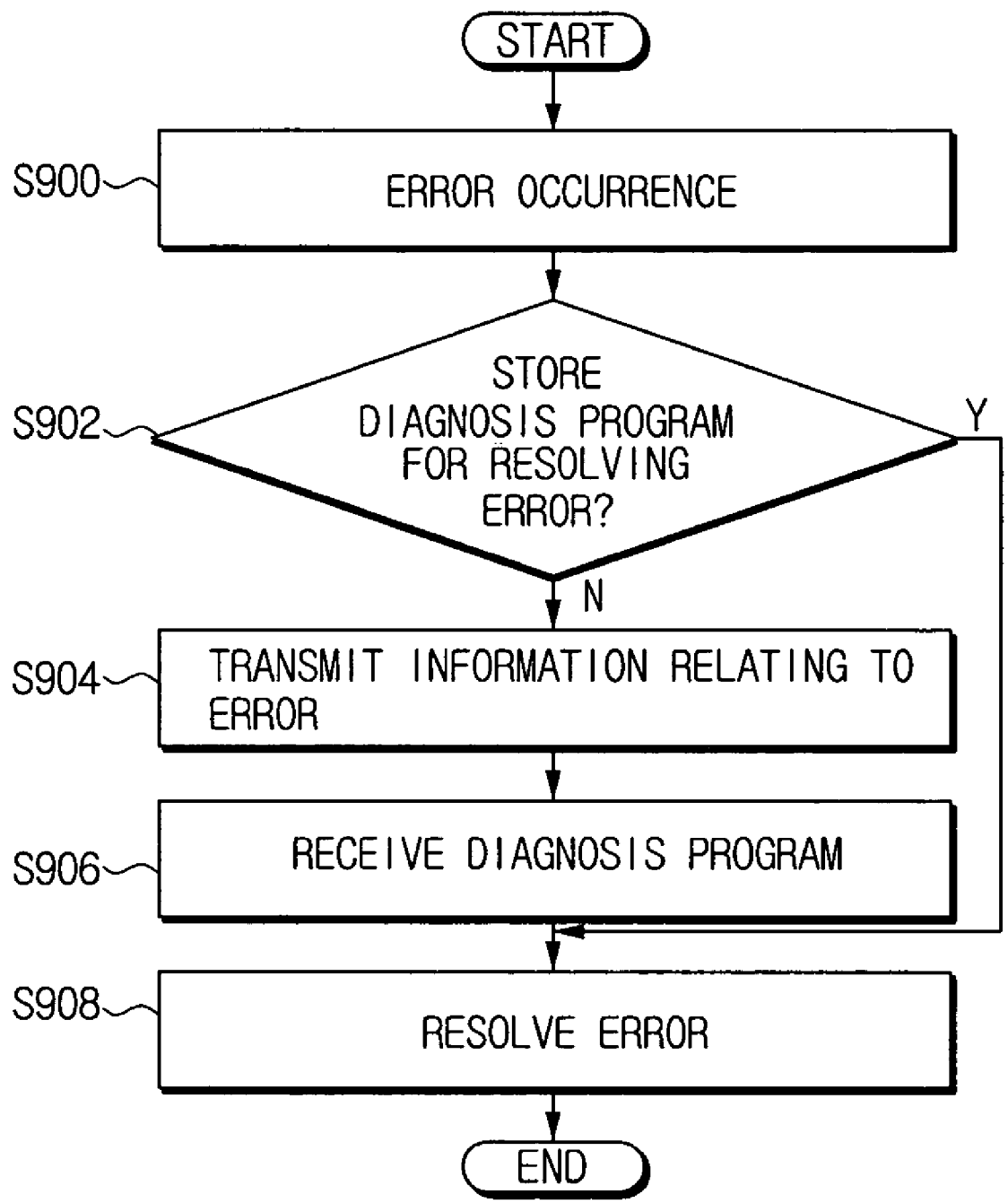
FIG. 9 is a flowchart of an operation of the device of FIG. 2 according to an embodiment of the present invention.

FIG. 9 illustrates an operation of the device according to an embodiment of the present invention.

A node detects an occurrence of error (S900). In particular, FIG. 9 explains the operation of the device having the error. The device determines whether a diagnosis program for resolving the error is stored (S902). If the diagnosis program for resolving the error is stored, the device proceeds to step S908, or if there is no diagnosis program for the error, the device proceeds to step S904.

The device transmits information relating to the error (S904) to the main server. The device receives a diagnosis program from the main server (S906).

The device resolves the error using the received diagnosis program or the stored diagnosis program (S908). Note that the device preferably stores the received diagnosis program. The device may provide the diagnosis result, which is obtained using the received diagnosis program or the stored diagnosis program, to the main server.

Figure 10:
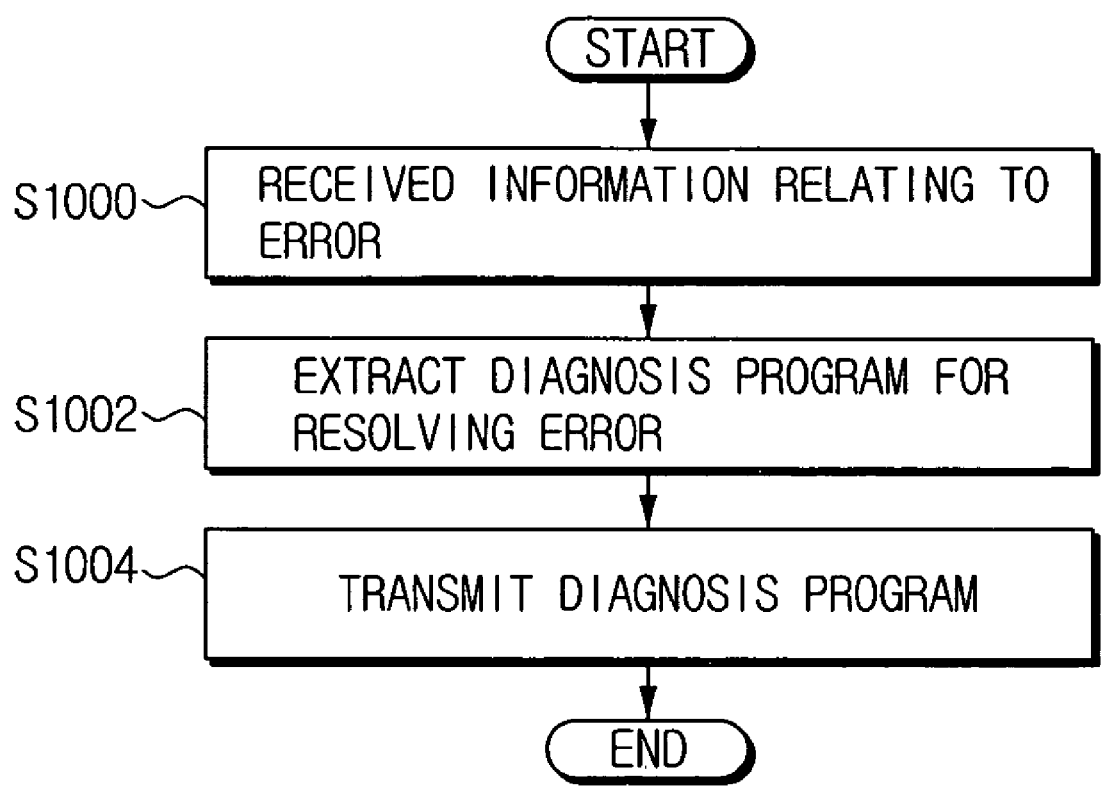
FIG. 10 is a flowchart of an operation of the main server of FIG. 3 according to an embodiment of the present invention.

FIG. 10 explains an operation of the main server according to an embodiment of the present invention.

The main server receives the information relating to the occurred error (S1000). The main server extracts a diagnosis program for resolving the error (S1002). Note that the main server stores diagnosis programs for errors that may occur at each device. The main server provides the extracted diagnosis program to the device (S1004).

In view of the foregoing, embodiments of the present invention can prevent unnecessary diagnoses by diagnosing only with respect to the diagnosis execution item provided from the main server. The main server can reduce main server load by sending the diagnosis menu and the diagnosis program to a device only once.

While the exemplary embodiments of the present invention have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the invention.

What is claimed is:

1. A diagnosis method of an image forming apparatus in a network system comprising a main server and at least one image forming apparatus which indicates to the main server a diagnosis result, the diagnosis method comprising the steps of:
   storing one or more diagnosis items and diagnosis execution information at an image forming apparatus to diagnose an image forming apparatus in a network system with respect to the diagnosis items;
   receiving from the main server a diagnosis execution item, before performing a diagnosis, to be diagnosed at the image forming apparatus requesting a diagnosis from among the diagnosis items; and
   performing the diagnosis during acquiring a diagnosis result after receiving diagnosis execution item achieved by use of the diagnosis execution information at the image forming apparatus and delivering the acquired diagnosis result to the main server by use of an electronic mail message,
   wherein the diagnosis items comprise a diagnosis menu and a diagnosis program.

2. The diagnosis method according to claim 1, wherein a diagnosis period for the diagnosis execution item is received, and the diagnosis is performed with respect to the diagnosis execution item according to the received diagnosis period.

3. The diagnosis method according to claim 1, wherein the diagnosis is performed for the diagnosis execution item when the main server requests to diagnose.

4. A method for providing to a main server a diagnosis result in a network system comprising the main server and at least one image forming apparatus which indicates to the main server of the diagnosis result, the method comprising the steps of:
   sending a diagnosis execution item, before performing a diagnosis, to be substantially diagnosed from among one or more diagnosis items from the main server to the image forming apparatus; and
   performing the diagnosis during providing a diagnosis result from the image forming apparatus to the main server after receiving the diagnosis execution item by use of diagnosis execution information to diagnose for the diagnosis items,
   wherein the diagnosis item and the diagnosis execution information are sent to the image forming apparatus using an electronic mail message at a network configuration phase, wherein the diagnosis items comprise a diagnosis menu and a diagnosis program.

5. The method according to claim 4, wherein a diagnosis period for the diagnosis execution item is sent together with the electronic mail message.

6. The method according to claim 5, wherein an electronic mail message requesting to diagnose is delivered to the image forming apparatus when a diagnosis result of the diagnosis execution item is not notified within the diagnosis period.

7. An image forming apparatus to diagnose an error in a network system comprising a main server and at least one image forming apparatus which notifies the main server of a diagnosis result, the image forming apparatus comprising:
   a storage for storing one or more diagnosis items and diagnosis execution information to diagnose an error with respect to the diagnosis items;
   an electronic mail receiver for receiving from the main server a diagnosis execution item, before performing a diagnosis, to be substantially diagnosed from among the diagnosis items; and
   a diagnosis part for acquiring a diagnosis result while performing the diagnosis after receiving the received diagnosis execution item by use of the diagnosis execution information,
   wherein the diagnosis items comprise a diagnosis menu and a diagnosis program.

8. The image forming apparatus according to claim 7, further comprising:
   a controller for controlling the diagnosis part to diagnose an error with respect to the diagnosis execution item according to a received diagnosis period when the diagnosis period for the diagnosis execution item is received from the main server.

9. The image forming apparatus according to claim 7, wherein the controller controls the diagnosis part to diagnose an error with respect to the diagnosis execution item when the diagnosis is requested from the main server.

10. The image forming apparatus according to claim 9, further comprising:
    an e-mail sender for sending the acquired diagnosis result using an electronic mail message to the main server.

11. A main server for receiving a diagnosis result in a network system comprising the main server and at least one image forming apparatus which notifies the main server of the diagnosis result, the main server comprising:
    an electronic mail sender for sending a diagnosis execution item, before performing a diagnosis, to be substantially diagnosed from among one or more diagnosis items at the image forming apparatus from the main server to the image forming apparatus; and
    an electronic mail receiver for receiving a diagnosis result while performing the diagnosis from the image forming apparatus generated in response to the diagnosis execution item, the diagnosis results being generated by the image forming apparatus by using locally stored diagnosis execution information to diagnose an error after receiving the diagnosis item,
    wherein the diagnosis items comprise a diagnosis menu and a diagnosis program.

12. The main server according to claim 11, wherein the electronic mail sender sends the diagnosis item and the diagnosis execution information to the image forming apparatus using an electronic mail message at a network configuration phase.

13. The main server according to claim 11, wherein the electronic mail sender sends a diagnosis period for the diagnosis execution item together with the electronic mail message.

14. The main server according to claim 13, further comprising:
    a controller for controlling the electronic mail sender to send an e-mail requesting to diagnose to the image forming apparatus when a diagnosis result of the diagnosis execution item is not received within the diagnosis period.

15. The main server according to claim 11, wherein the one or more diagnosis items comprise at least one diagnosis program and a diagnosis menu.

16. The main server according to claim 11, wherein the diagnosis execution item comprises a diagnosis menu and diagnosis program that are to be used for a requested diagnosis.

17. The main server according to claim 12, wherein the diagnosis execution item identifies the diagnosis execution information to be used to perform the requested diagnosis of a related diagnosis item, the diagnosis item comprising at least one diagnosis program and a diagnosis menu.

18. A method to resolve an error of a system comprising an image forming apparatus and a main server, comprising the steps of:
    transmitting information relating to an occurred error from the main server to the image forming apparatus when a diagnosis program for resolving the error is not stored, wherein the transmitted information comprises at least one diagnosis program, a diagnosis menu and diagnosis execution information;
    receiving, by the image forming apparatus, a diagnosis program for resolving the error; and
    resolving, by the image forming apparatus, the error using the received diagnosis program.

19. The method according to claim 18, wherein the information relating to the occurred error and the diagnosis program are transmitted and received using an electronic mail message.

20. The method according to claim 18, wherein the received diagnosis program is stored.

21. The method according to claim 18, wherein a diagnosis result of the occurred error is delivered to a main server.

* * * * *